US011120632B2

(12) United States Patent
Ohashi

(10) Patent No.: US 11,120,632 B2
(45) Date of Patent: Sep. 14, 2021

(54) IMAGE GENERATING APPARATUS, IMAGE GENERATING SYSTEM, IMAGE GENERATING METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/590,957

(22) Filed: Oct. 2, 2019

(65) Prior Publication Data

US 2020/0118341 A1 Apr. 16, 2020

(30) Foreign Application Priority Data

Oct. 16, 2018 (JP) .............................. JP2018-195220
Apr. 18, 2019 (JP) .............................. JP2019-079475

(51) Int. Cl.
*G06T 19/00* (2011.01)
*G02B 27/01* (2006.01)
*H04N 9/75* (2006.01)

(52) U.S. Cl.
CPC ........ *G06T 19/006* (2013.01); *G02B 27/0172* (2013.01); *G02B 27/0179* (2013.01); *H04N 9/75* (2013.01); *G02B 2027/014* (2013.01); *G02B 2027/0138* (2013.01); *G02B 2027/0187* (2013.01)

(58) Field of Classification Search
None
See application file for complete search history.

(56) References Cited

U.S. PATENT DOCUMENTS

| 5,737,031 A * | 4/1998 | Tzidon .................. H04N 5/222 348/587 |
| 9,551,871 B2 * | 1/2017 | Sugden ................ G02B 27/017 |
| 2008/0267454 A1 * | 10/2008 | Kobayashi ......... G06K 9/00201 382/106 |
| 2008/0267523 A1 * | 10/2008 | Shimoyama ............. H04N 9/75 382/254 |
| 2008/0304737 A1 * | 12/2008 | Kajita .................. H04N 19/182 382/165 |
| 2015/0193982 A1 * | 7/2015 | Mihelich ................ H04L 67/18 345/633 |

(Continued)

*Primary Examiner* — Jwalant Amin
(74) *Attorney, Agent, or Firm* — Matthew B. Dernier, Esq.

(57) ABSTRACT

An image generating apparatus includes a rendering unit carrying out rendering of an object of a virtual space and an object of a real space and carrying out rendering of expression relating to light of the virtual space with respect to the real space to generate a computer graphics image, a superimposing unit superimposing the computer graphics image on a photographed image of the real space to generate a provisional superposition image, a chroma key generating unit generating a chroma key image through executing chroma key processing for the computer graphics image based on depth information of the photographed image of the real space, and a synthesizing unit generating a synthesized chroma key image used for being superimposed on the photographed image of the real space to generate an augmented reality image by applying a mask to the provisional superposition image by the chroma key image.

10 Claims, 12 Drawing Sheets

(56) References Cited

U.S. PATENT DOCUMENTS

| | | | |
|---|---|---|---|
| 2019/0065027 A1* | 2/2019 | Hauenstein | G06T 19/006 |
| 2019/0188914 A1* | 6/2019 | Ogasawara | G06T 19/006 |
| 2019/0347846 A1* | 11/2019 | Olson | G06T 7/40 |
| 2020/0279438 A1* | 9/2020 | Ohashi | G06F 3/012 |
| 2020/0312033 A1* | 10/2020 | Ohashi | H04N 5/64 |

* cited by examiner

IMAGE GENERATING APPARATUS, IMAGE GENERATING SYSTEM, IMAGE GENERATING METHOD, AND PROGRAM

BACKGROUND

This disclosure relates to an apparatus, a system, and a method that generate an image.

Mounting a head-mounted display connected to a game machine on a head and playing a game through operation of a controller or the like while viewing a screen displayed on the head-mounted display have been carried out. When the head-mounted display is mounted, there is an effect that a sense of immersion in a video world is enhanced and the entertainment property of the game is further enhanced because the user views nothing other than the video displayed on the head-mounted display. Furthermore, if video of virtual reality (VR) is displayed on the head-mounted display and an omnidirectional virtual space in which a 360-degree view can be seen when the user who wears the head-mounted display rotates the head is allowed to be displayed, the sense of immersion in the video is further enhanced and the operability of the application of a game or the like is also improved.

Furthermore, although a user who wears a non-transmissive head-mounted display becomes incapable of directly seeing the external world, there is also a head-mounted display of a video-transmissive (video see-through) type that can photograph video of the external world by a camera mounted on the head-mounted display and display the video on a display panel. In the head-mounted display of the video-transmissive type, it is also possible to generate and display video of augmented reality (AR) by superimposing objects of a virtual world generated based on computer graphics (CG) on the video of the external world photographed by the camera. Differently from the virtual reality separated from the real world, the video of the augmented reality is what is obtained through augmentation of the real world by the virtual objects, and the user can experience the virtual world while being aware of a connection with the real world.

SUMMARY

In the case of superimposing a virtual object generated based on CG on a camera image to generate video of augmented reality and display the video on a head-mounted display, aliasing occurs at the boundary of the virtual object due to the influence of a post-process on the image and the boundary between the virtual world and the real world is conspicuous and AR video with a sense of unity is not obtained in some cases. Furthermore, if a shadow cast on the real space by a virtual object and a reflection of the virtual object onto the real space are not reflected in the AR video, a sense of unity between the virtual world and the real world is not obtained and the virtual object looks like being out of place in the real world.

The present disclosure is made in view of such problems and there is a need for providing an image generating apparatus, an image generating system, and an image generating method that can improve the quality of video of augmented reality.

According to an embodiment of the present disclosure, there is provided an image generating apparatus including a rendering unit configured to carry out rendering of an object of a virtual space and an object of a real space and carry out rendering of expression relating to light of the virtual space with respect to the real space to generate a computer graphics image, a superimposing unit configured to superimpose the computer graphics image on a photographed image of the real space to generate a provisional superposition image, a chroma key generating unit configured to generate a chroma key image through executing chroma key processing for the computer graphics image based on depth information of the photographed image of the real space, and a synthesizing unit configured to generate a synthesized chroma key image used for being superimposed on the photographed image of the real space to generate an augmented reality image by applying a mask to the provisional superposition image by the chroma key image. The chroma key generating unit employs a region of the real space in which the object of the virtual space is not rendered as a chroma key region and does not employ a region of the real space in which the expression relating to the light of the virtual space exists as a chroma key region.

According to another embodiment of the present disclosure, there is provided an image generating system including a head-mounted display and an image generating apparatus. The image generating apparatus includes a rendering unit configured to carry out rendering of an object of a virtual space and an object of a real space and carry out rendering of expression relating to light of the virtual space with respect to the real space to generate a computer graphics image, a first superimposing unit configured to superimpose the computer graphics image on a photographed image of the real space transmitted from the head-mounted display to generate a provisional superposition image, a chroma key generating unit configured to generate a chroma key image through executing chroma key processing for the computer graphics image based on depth information of the photographed image of the real space transmitted from the head-mounted display, and a synthesizing unit configured to generate a synthesized chroma key image used for being superimposed on the photographed image of the real space to generate an augmented reality image by applying a mask to the provisional superposition image by the chroma key image. The head-mounted display includes a second superimposing unit configured to generate the augmented reality image by synthesizing the photographed image of the real space with the synthesized chroma key image transmitted from the image generating apparatus. The chroma key generating unit employs a region of the real space in which the object of the virtual space is not rendered as a chroma key region and does not employ a region of the real space in which the expression relating to the light of the virtual space exists as a chroma key region.

According to a further embodiment of the present disclosure, there is provided an image generating method including carrying out rendering of an object of a virtual space and an object of a real space and carrying out rendering of expression relating to light of the virtual space with respect to the real space to generate a computer graphics image, superimposing the computer graphics image on a photographed image of the real space to generate a provisional superposition image, generating a chroma key image through executing chroma key processing for the computer graphics image based on depth information of the photographed image of the real space, and generating a synthesized chroma key image used for being superimposed on the photographed image of the real space to generate an augmented reality image by applying a mask to the provisional superposition image by the chroma key image. The generating a chroma key image employs a region of the real space in which the object of the virtual space is not rendered as a chroma key region and does not employ a region of the real space in which the expression relating to the light of the virtual space exists as a chroma key region.

What are obtained by translating arbitrary combinations of the above constituent elements and expressions of the present disclosure among method, apparatus, system, computer program, data structure, recording medium, and so forth are also effective as embodiments of the present disclosure.

According to the present disclosure, the quality of video of augmented reality can be improved.

DETAILED DESCRIPTION OF PREFERRED EMBODIMENTS

Figure 1:
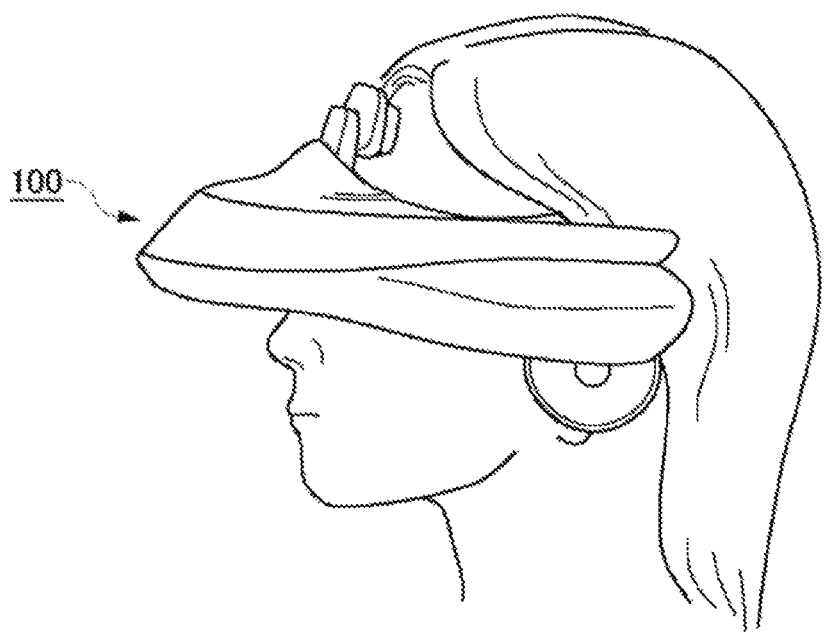
FIG. 1 is an appearance diagram of a head-mounted display.

FIG. 1 is an appearance diagram of a head-mounted display 100. The head-mounted display 100 is a display apparatus for being mounted on the head of a user to allow the user to view a still image, moving image, or the like displayed on a display and listen to sound, music, or the like output from a headphone.

Position information of the head of the user who wears the head-mounted display 100 and orientation information such as the rotational angle and tilt of the head can be measured by gyro sensor, acceleration sensor, and so forth incorporated in or externally attached to the head-mounted display 100.

The head-mounted display 100 is equipped with a camera unit and the external world can be photographed while the user wears the head-mounted display 100.

The head-mounted display 100 is one example of a "wearable display." Here, a generating method of an image displayed on the head-mounted display 100 will be described. However, the image generating method of the present embodiment can be applied to not only the case in which a user wears the head-mounted display 100 in a narrow sense but also the case in which a user wears eyeglasses, eyeglasses-type display, eyeglasses-type camera, headphone, headset (headphone equipped with a microphone), earphone, earring, ear-hook camera, headwear, headwear equipped with a camera, hair band, or the like.

Figure 2:
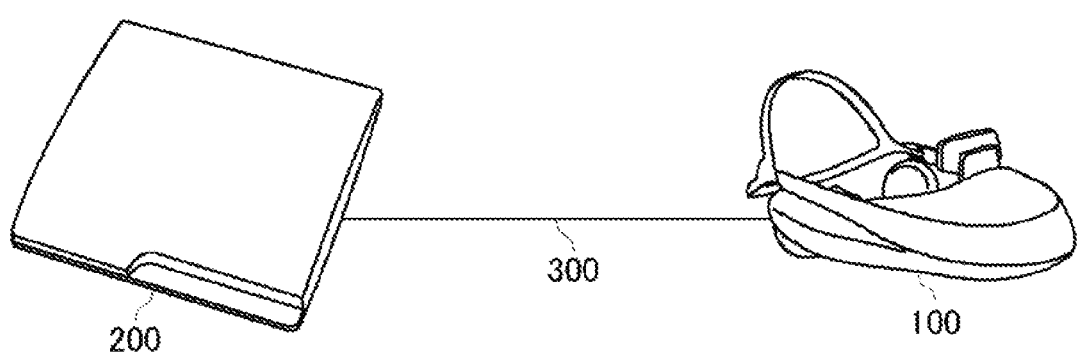
FIG. 2 is a configuration diagram of an image generating system according to embodiments of the present disclosure.

FIG. 2 is a configuration diagram of an image generating system according to the present embodiment. As one example, the head-mounted display 100 is connected to an image generating apparatus 200 by an interface 300 of the high-definition multimedia interface (HDMI) (registered trademark), which is a standard specification of a communication interface to transmit video and sound by a digital signal, or the like.

The image generating apparatus 200 predicts position-orientation information of the head-mounted display 100 in consideration of delay from generation of video to display thereof from the present position-orientation information of the head-mounted display 100 and renders the image to be displayed on the head-mounted display 100 on the premise of the predicted position-orientation information of the head-mounted display 100 to transmit the image to the head-mounted display 100.

One example of the image generating apparatus 200 is a game machine. The image generating apparatus 200 may be further connected to a server through a network. In this case, the server may provide an online application such as a game in which plural users can participate through the network to the image generating apparatus 200. The head-mounted display 100 may be connected to a computer or portable terminal instead of the image generating apparatus 200.

With reference to FIG. 3 to FIG. 6, an augmented reality image obtained by superimposing a virtual object based on CG on a camera image will be described.

Figure 3:
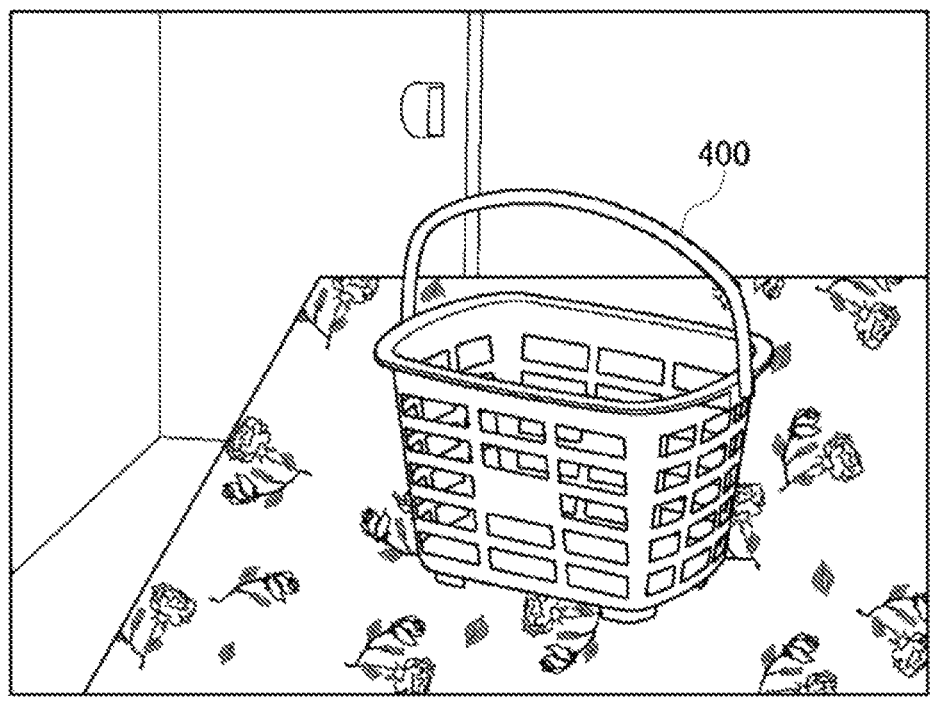
FIG. 3 is a diagram explaining an example of a camera image photographed by a camera mounted on the head-mounted display of FIG. 1.

FIG. 3 is a diagram explaining an example of a camera image photographed by the camera mounted on the head-mounted display 100. This camera image is what is obtained by photographing a table and a basket 400 existing thereon, with a room being the background. The surface of the table is given a floral pattern. Although the background hardly changes in the camera image, a user reaches out a hand and moves the basket 400 existing on the table in some cases.

Figure 4:
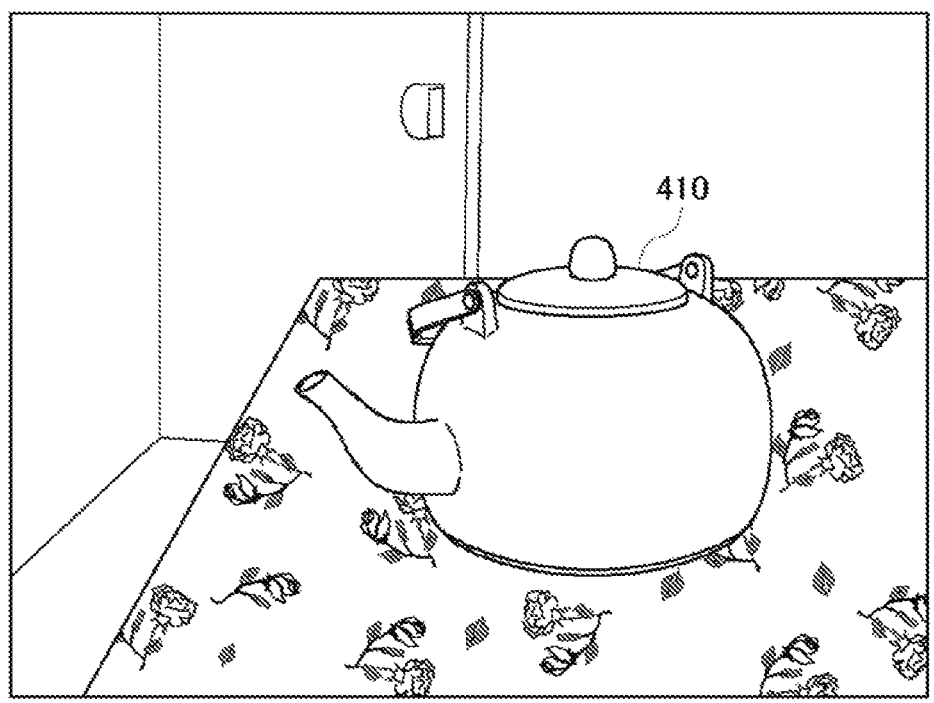
FIG. 4 is a diagram explaining an augmented reality image obtained by superimposing a virtual object based on CG on the camera image of FIG. 3.

FIG. 4 is a diagram explaining an augmented reality image obtained by superimposing a virtual object based on CG on the camera image of FIG. 3. The basket 400, which is a real object existing on the table, is replaced by a teapot 410 that is the virtual object generated based on CG and the teapot 410 is superimposed on the camera image. This allows the user to view the augmented reality image in which the virtual object is drawn in the real space by the head-mounted display 100.

Figure 5:
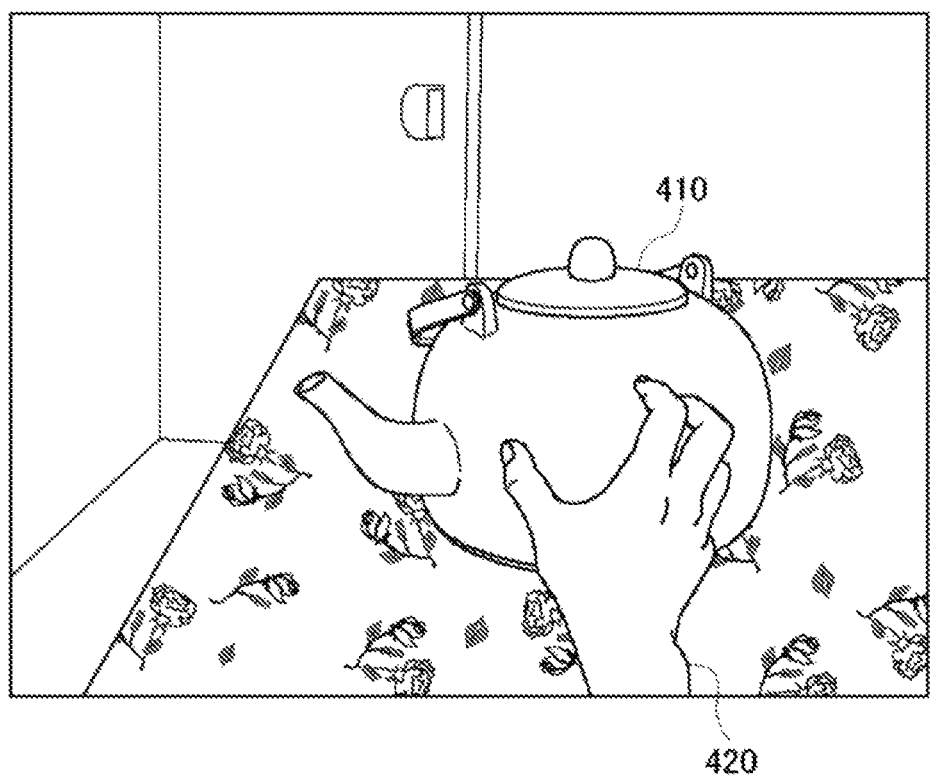
FIG. 5 is a diagram illustrating a state in which a user reaches out a hand for the virtual object with respect to the augmented reality image of FIG. 4.

FIG. 5 is a diagram illustrating a state in which the user reaches out a hand for the virtual object with respect to the augmented reality image of FIG. 4. When the user who is viewing the augmented reality image by the head-mounted display 100 attempts to touch the teapot 410, which is the virtual object, the hand of the user is photographed by the camera mounted on the head-mounted display 100 and thus a hand 420 is captured in the camera image. The teapot 410, which is the virtual object, is superimposed on the camera image in which the hand 420 is captured. At this time, it is desired to correctly determine the positional relation between the teapot 410 and the hand 420 by using depth information such that the obtained image may be kept from becoming an unnatural augmented reality image such as an image in which the teapot 410 is superimposed on the hand 420 and the hand 420 becomes invisible.

Therefore, the depth information of the camera image is used to determine the positional relation between a thing captured in the camera image and the virtual object and rendering in which the depth is correctly reflected is carried out. The depth is known in advance regarding the background of the room and the basket 400 regarding which existence has been already known, and therefore the positional relation with the virtual object can be determined in advance. However, when the user reaches out a hand or foot or in the case in which a moving body other than the user (another person, dog, cat, or the like, for example) comes into the field of view, or the like, the depth is not known in advance and therefore it is desired to determine the depth from the depth information of the camera image on each occasion.

In general, when a CG image is superimposed on a camera image, a chroma key image obtained by painting out, with specific one color, the region that is not rendered, such as the background, in the CG image is created and is used for chroma key synthesis. The region of the color specified as the chroma key (referred to as "chroma key region") becomes transparent. Therefore, when the chroma key image is superimposed on the camera image, the camera image is displayed in the chroma key region.

Figure 6:
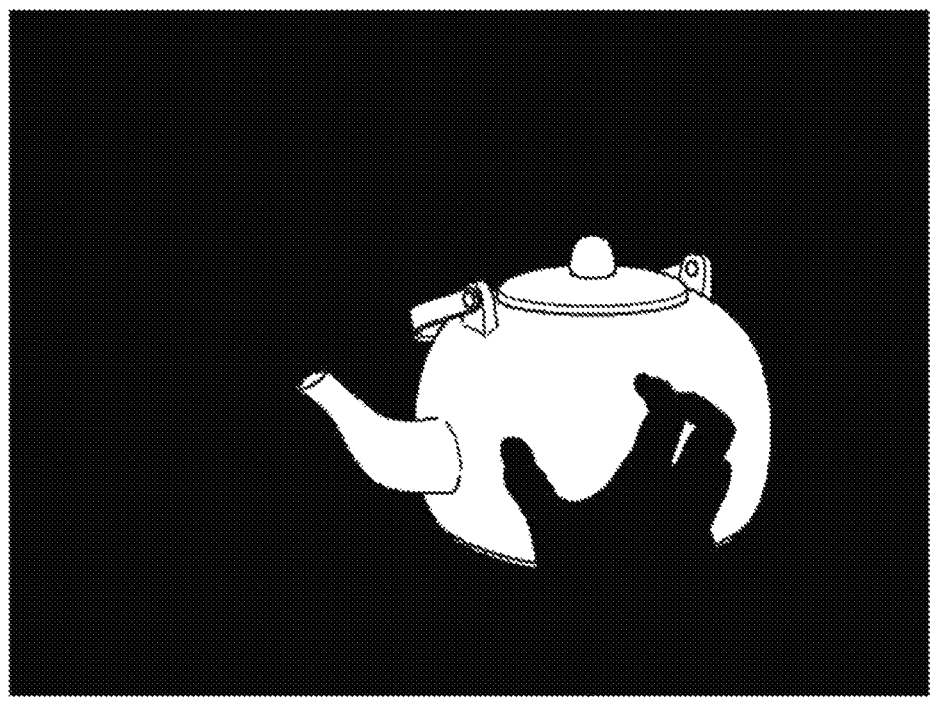
FIG. 6 is a diagram explaining a CG image used for chroma key synthesis.

FIG. 6 is a diagram explaining the CG image used for the chroma key synthesis. In the state of FIG. 5, the background is pained out with the specific color of the chroma key (red, for example). Furthermore, the hand 420 captured in the camera image exists on the near side relative to the teapot 410. Thus, the region hidden by the hand 420 in the region of the teapot 410 is also painted out with the specific color of the chroma key. When this chroma key image is superimposed on the camera image, the camera image is left and the augmented reality image of FIG. 5 is obtained because the part of the specific color of the chroma key is transparent.

Figure 7:
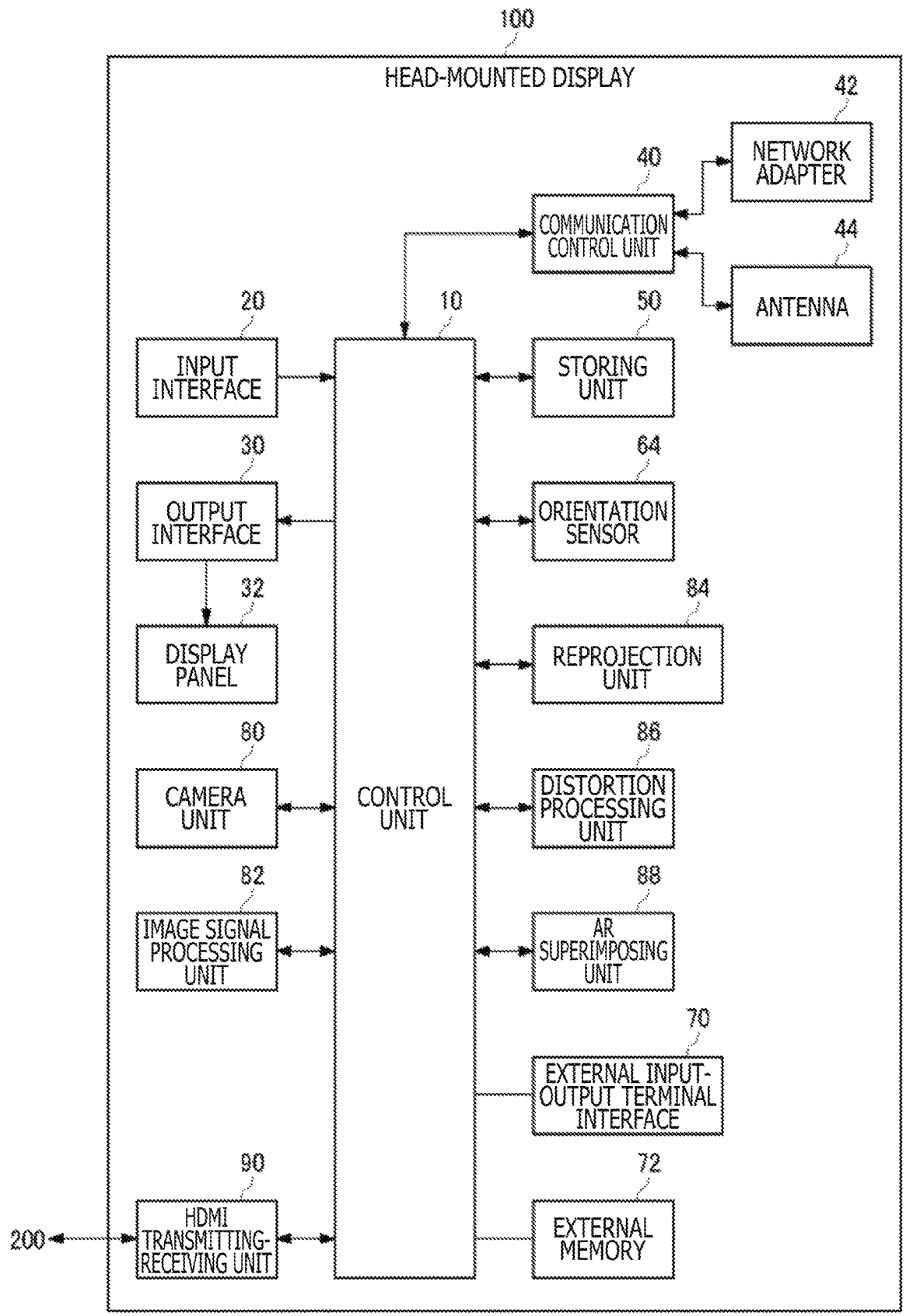
FIG. 7 is a functional configuration diagram of a head-mounted display according to a premise technique.

FIG. 7 is a functional configuration diagram of the head-mounted display 100 according to a premise technique.

A control unit 10 is a main processor that processes and outputs signals such as image signal and sensor signal and instructions and data. An input interface 20 accepts operation signal and setting signal from a user and supplies them to the control unit 10. An output interface 30 receives the image signal from the control unit 10 and displays an image on a display panel 32.

A communication control unit 40 transmits data input from the control unit 10 to the external through a network adapter 42 or an antenna 44 by wired or wireless communication. Furthermore, the communication control unit 40 receives data from the external and outputs the data to the control unit 10 through the network adapter 42 or the antenna 44 by wired or wireless communication.

A storing unit 50 temporarily stores data, parameters, operation signal, and so forth processed by the control unit 10.

An orientation sensor 64 detects position information of the head-mounted display 100 and orientation information such as the rotational angle and tilt of the head-mounted display 100. The orientation sensor 64 is implemented by appropriately combining gyro sensor, acceleration sensor, angular acceleration sensor, and so forth. The forward-rearward, rightward-leftward, upward-downward motion of the head of the user may be detected by using a motion sensor obtained by combining at least one or more of three-axis geomagnetic sensor, three-axis acceleration sensor, and three-axis gyro (angular velocity) sensor.

An external input-output terminal interface 70 is an interface for connecting peripheral equipment such as a universal serial bus (USB) controller. An external memory 72 is an external memory such as a flash memory.

A camera unit 80 includes configurations for photographing, such as lens, image sensor, and ranging sensor, and supplies video and depth information of the photographed external world to the control unit 10. The control unit 10 controls focus, zoom, and so forth of the camera unit 80.

An image signal processing unit 82 executes image signal processing (ISP) such as RGB conversion (demosaic processing), white balance, color correction, and noise reduction for a Raw image photographed by the camera unit 80, and executes distortion correction processing of removing distortion and so forth attributed to the optical system of the camera unit 80. The image signal processing unit 82 supplies a camera image for which the image signal processing and the distortion correction processing have been executed to the control unit 10.

A reprojection unit 84 executes reprojection processing for the camera image based on the latest position-orientation information of the head-mounted display 100 detected by the orientation sensor 64 to convert the image to an image viewed from the latest position of the point of view and the latest direction of the line of sight of the head-mounted display 100.

A distortion processing unit 86 executes processing of deforming and distorting an image in conformity to distortion that occurs in the optical system of the head-mounted display 100 for the camera image for which the reprojection processing has been executed, and supplies the camera image for which the distortion processing has been executed to the control unit 10.

An AR superimposing unit 88 generates an augmented reality image by superimposing a CG image generated by the image generating apparatus 200 on the camera image for which the distortion processing has been executed, and supplies the augmented reality image to the control unit 10.

An HDMI transmitting-receiving unit 90 transmits and receives a digital signal of video and sound to and from the image generating apparatus 200 in accordance with the HDMI. The HDMI transmitting-receiving unit 90 receives, from the control unit 10, the RGB image for which the image signal processing and the distortion correction processing have been executed by the image signal processing unit 82 and depth information and transmits them to the image generating apparatus 200 by an HDMI transmission path. The HDMI transmitting-receiving unit 90 receives an image generated by the image generating apparatus 200 from the image generating apparatus 200 by the HDMI transmission path and supplies the image to the control unit 10.

The control unit 10 can supply an image or text data to the output interface 30 to cause the display panel 32 to display it, and supply it to the communication control unit 40 to cause the communication control unit 40 to transmit it to the external.

The present position-orientation information of the head-mounted display 100 detected by the orientation sensor 64 is notified to the image generating apparatus 200 through the communication control unit 40 or the external input-output terminal interface 70. Alternatively, the HDMI transmitting-receiving unit 90 may transmit the present position-orientation information of the head-mounted display 100 to the image generating apparatus 200.

Figure 8:
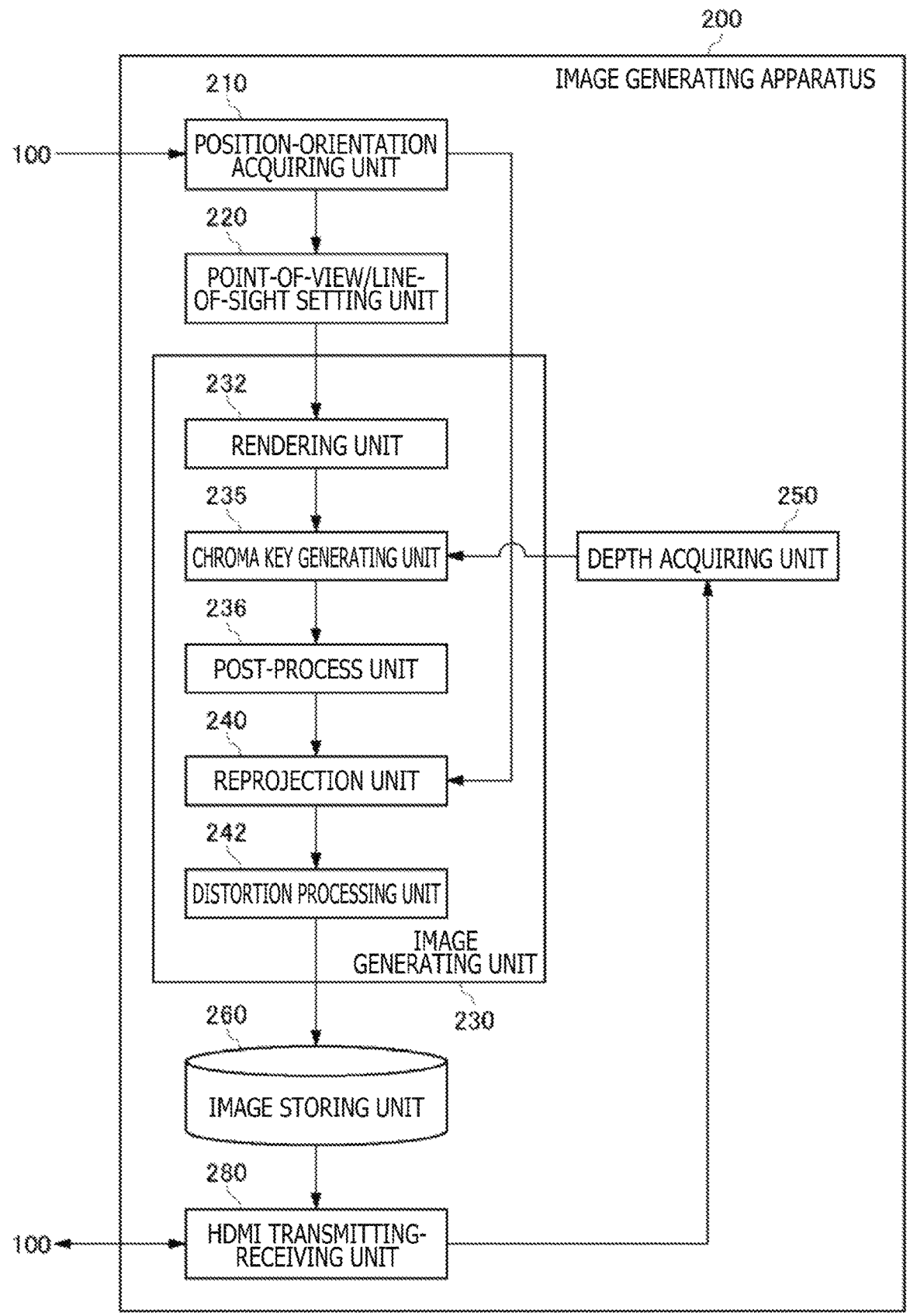
FIG. 8 is a functional configuration diagram of an image generating apparatus according to the premise technique.

FIG. 8 is a functional configuration diagram of the image generating apparatus 200 according to the premise technique. This diagram depicts a block diagram in which attention is paid to functions and these functional blocks can be implemented in various forms by only hardware, only software, or a combination of them.

At least part of the functions of the image generating apparatus 200 may be implemented in the head-mounted display 100. Alternatively, at least part of the functions of the image generating apparatus 200 may be implemented in a server connected to the image generating apparatus 200 through a network.

A position-orientation acquiring unit 210 acquires the present position-orientation information of the head-mounted display 100 from the head-mounted display 100.

A point-of-view/line-of-sight setting unit 220 sets the position of the point of view and the direction of the line of sight of a user by using the position-orientation information of the head-mounted display 100 acquired by the position-orientation acquiring unit 210.

An HDMI transmitting-receiving unit 280 receives the depth information of video of a real space photographed by the camera unit 80 from the head-mounted display 100 and supplies the depth information to a depth acquiring unit 250.

An image generating unit 230 reads out data for generation of computer graphics from an image storing unit 260 and carries out rendering of objects of a virtual space to generate a CG image. Then, the image generating unit 230 generates a chroma key image from the CG image based on the depth information of the camera image of the real space provided from the depth acquiring unit 250 and outputs the chroma key image to the image storing unit 260.

The image generating unit 230 includes a rendering unit 232, a chroma key generating unit 235, a post-process unit 236, a reprojection unit 240, and a distortion processing unit 242.

The rendering unit 232 generates the CG image through rendering of objects of a virtual space that are visible in the direction of the line of sight from the position of the point of view of the user who wears the head-mounted display 100 in accordance with the position of the point of view and the direction of the line of sight of the user set by the point-of-view/line-of-sight setting unit 220, and gives the CG image to the chroma key generating unit 235.

The chroma key generating unit 235 generates a chroma key image from the CG image based on the depth information of the camera image given from the depth acquiring unit 250. Specifically, the chroma key generating unit 235 determines the positional relation between the objects of the real space and the objects of the virtual space and generates the chroma key image (referred to as "CG chroma key image") obtained by painting out, with specific one color (red, for example), the background of the virtual objects and the part of the object of the real space existing on the near side relative to the virtual object in the CG image.

The post-process unit 236 executes a post-process such as adjustment of the depth of field, tone mapping, and anti-aliasing for the CG chroma key image and executes post-processing in such a manner that the CG chroma key image looks natural and smooth.

The reprojection unit 240 receives the latest position-orientation information of the head-mounted display 100 from the position-orientation acquiring unit 210 and executes reprojection processing for the CG chroma key image for which the post-process has been executed to convert the image to an image viewed from the latest position of the point of view and the latest direction of the line of sight of the head-mounted display 100.

Here, a description will be made regarding the reprojection. In the case of allowing the head-mounted display 100 to have a head-tracking function and generating video of virtual reality with change in the point of view and the direction of the line of sight in conjunction with the motion of the head of the user, delay exists from the generation of the video of virtual reality to display thereof. Thus, a deviation occurs between the direction of the head of the user employed as the premise at the time of video generation and the direction of the head of the user at the timing when the video is displayed on the head-mounted display 100 and the user falls into a sick-like feeling (called virtual reality sickness (VR sickness) or the like) in some cases.

As above, a long time is taken until the motion of the head-mounted display 100 is detected and a central processing unit (CPU) issues a rendering command and a graphics processing unit (GPU) executes rendering and a rendered image is output to the head-mounted display 100. Suppose that the rendering is carried out at a frame rate of 60 fps (frame/seconds), for example, and delay corresponding to one frame occurs from detection of the motion of the head-mounted display 100 to output of the image. This is approximately 16.67 milliseconds under the frame rate of 60 fps and is a sufficient time for the human to perceive the deviation.

Therefore, processing called "time warp" or "reprojection" is executed and the rendered image is corrected in conformity to the latest position and orientation of the head-mounted display 100 to cause the human to perceive the deviation less readily.

The distortion processing unit 242 executes processing of deforming and distorting an image in conformity to distortion that occurs in the optical system of the head-mounted display 100 for the CG chroma key image for which the reprojection processing has been executed, and stores the resulting image in the image storing unit 260.

The HDMI transmitting-receiving unit 280 reads out frame data of the CG chroma key image generated by the image generating unit 230 from the image storing unit 260 and transmits the frame data to the head-mounted display 100 in accordance with the HDMI.

Figure 9:
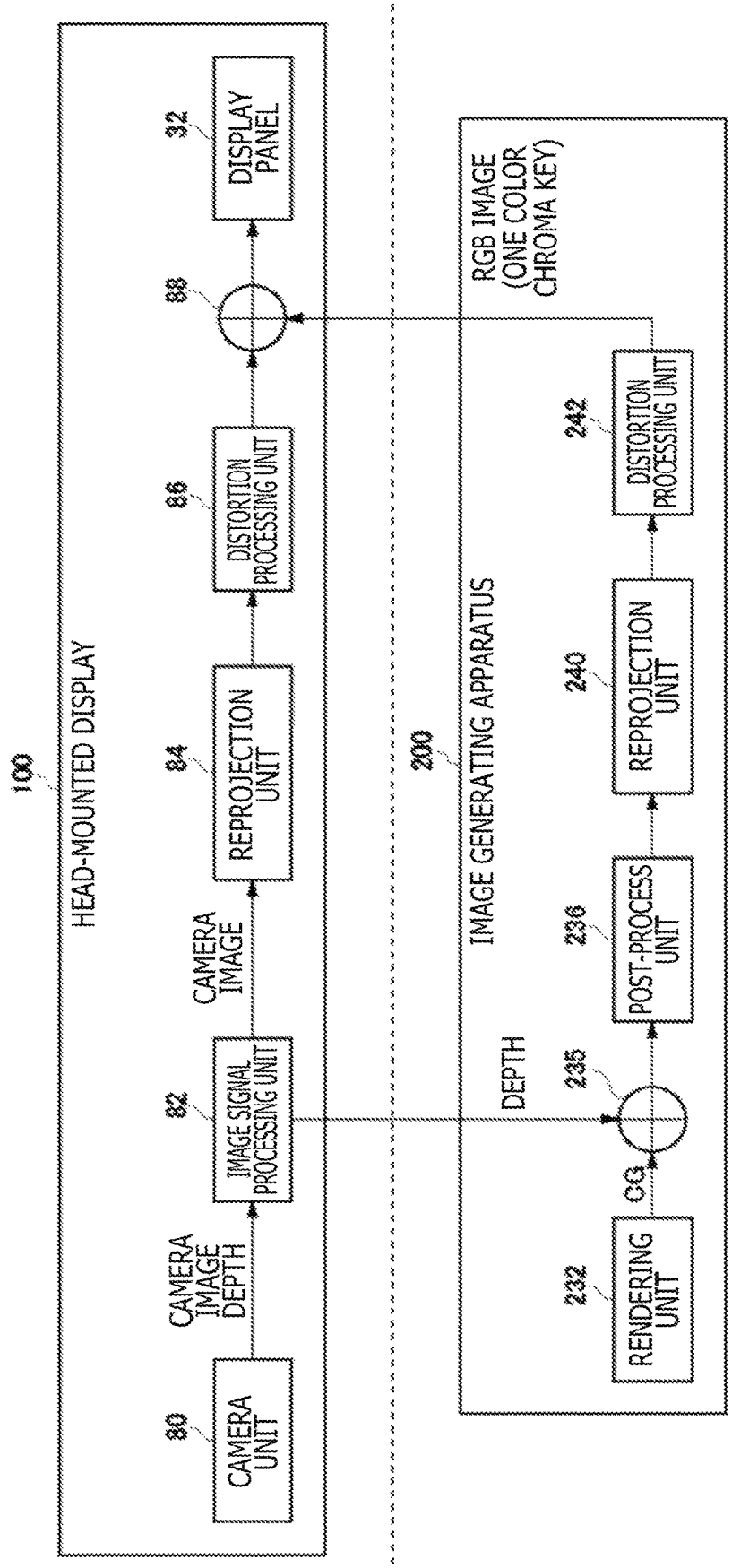
FIG. 9 is a diagram explaining the configuration of an image generating system according to the premise technique for superimposing a CG image on a camera image to generate an augmented reality image.

FIG. 9 is a diagram explaining the configuration of an image generating system according to the premise technique for superimposing a CG image on a camera image to generate an augmented reality image. Here, for simplification of the description, the main configuration of the head-mounted display 100 and the image generating apparatus 200 for generating an augmented reality image is diagrammatically represented and will be described.

Camera image and depth information of the external world photographed by the camera unit 80 of the head-mounted display 100 are supplied to the image signal processing unit 82. The image signal processing unit 82 executes the image signal processing and the distortion correction processing for the camera image and gives the resulting image to the reprojection unit 84. The image signal processing unit 82 transmits the depth information to the image generating apparatus 200 to supply it to the chroma key generating unit 235.

The rendering unit 232 of the image generating apparatus 200 generates virtual objects viewed from the position of the point of view and the direction of the line of sight of the user who wears the head-mounted display 100 and gives the virtual objects to the chroma key generating unit 235.

The chroma key generating unit 235 generates a CG chroma key image from a CG image based on the depth information. The post-process unit 236 executes the post-process for the CG chroma key image. The reprojection unit 240 converts the CG chroma key image for which the post-process has been executed in conformity to the latest position of the point of view and the latest direction of the line of sight. The distortion processing unit 242 executes the distortion processing for the CG chroma key image after the reprojection. The final RGB image after the distortion processing is transmitted to the head-mounted display 100 and is supplied to the AR superimposing unit 88. This RGB image is an image in which the region on which the camera image should be superimposed is painted out with one color (red, for example) specified in the chroma key synthesis. The one color specified for the chroma key is not used as the CG image. Therefore, expression is carried out by using another color with avoidance of the one color specified for the chroma key in the CG image. For example, when the same color as the chroma key color is desired to be used in the CG image, a color obtained by changing one bit of the chroma key color may be used.

The reprojection unit 84 of the head-mounted display 100 converts the camera image for which the image signal processing and the distortion correction processing have been executed in conformity to the latest position of the point of view and the latest direction of the line of sight and supplies the resulting image to the distortion processing unit 86. The distortion processing unit 86 executes the distortion processing for the camera image after the reprojection. The AR superimposing unit 88 generates an augmented reality image by superimposing the CG chroma key image supplied from the image generating apparatus 200 on the camera image after the distortion processing. The generated augmented reality image is displayed on the display panel 32.

In the above-described image generating system according to the premise technique, the CG chroma key image generated by the chroma key generating unit 235 undergoes the post-process by the post-process unit 236, the reprojection processing by the reprojection unit 240, and the distortion processing by the distortion processing unit 242. Therefore, aliasing occurs at the boundary of the virtual object and a false color that does not exist actually occurs, and unnaturalness becomes conspicuous when the CG chroma key image is superimposed on the camera image by the AR superimposing unit 88. Furthermore, the transmission interface of the general image is compatible with RGB but is not compatible with RGBA including the alpha value. Therefore, it is difficult to transmit the alpha value and thus the image generating system is also subject to the limitation that it is difficult to express a translucent CG image. To express a shadow cast on a real space by a virtual object and a reflection of the virtual object onto the real space, the translucent CG image is desired to be synthesized with a camera image.

Image generating systems according to several embodiments that overcome the problems in the image generating system according to the premise technique will be described below. However, description overlapping with the premise technique is omitted as appropriate and configurations improved from the premise technique will be described.

A first embodiment will be described. The configuration of the head-mounted display 100 is the same as that illustrated in FIG. 7.

Figure 10:
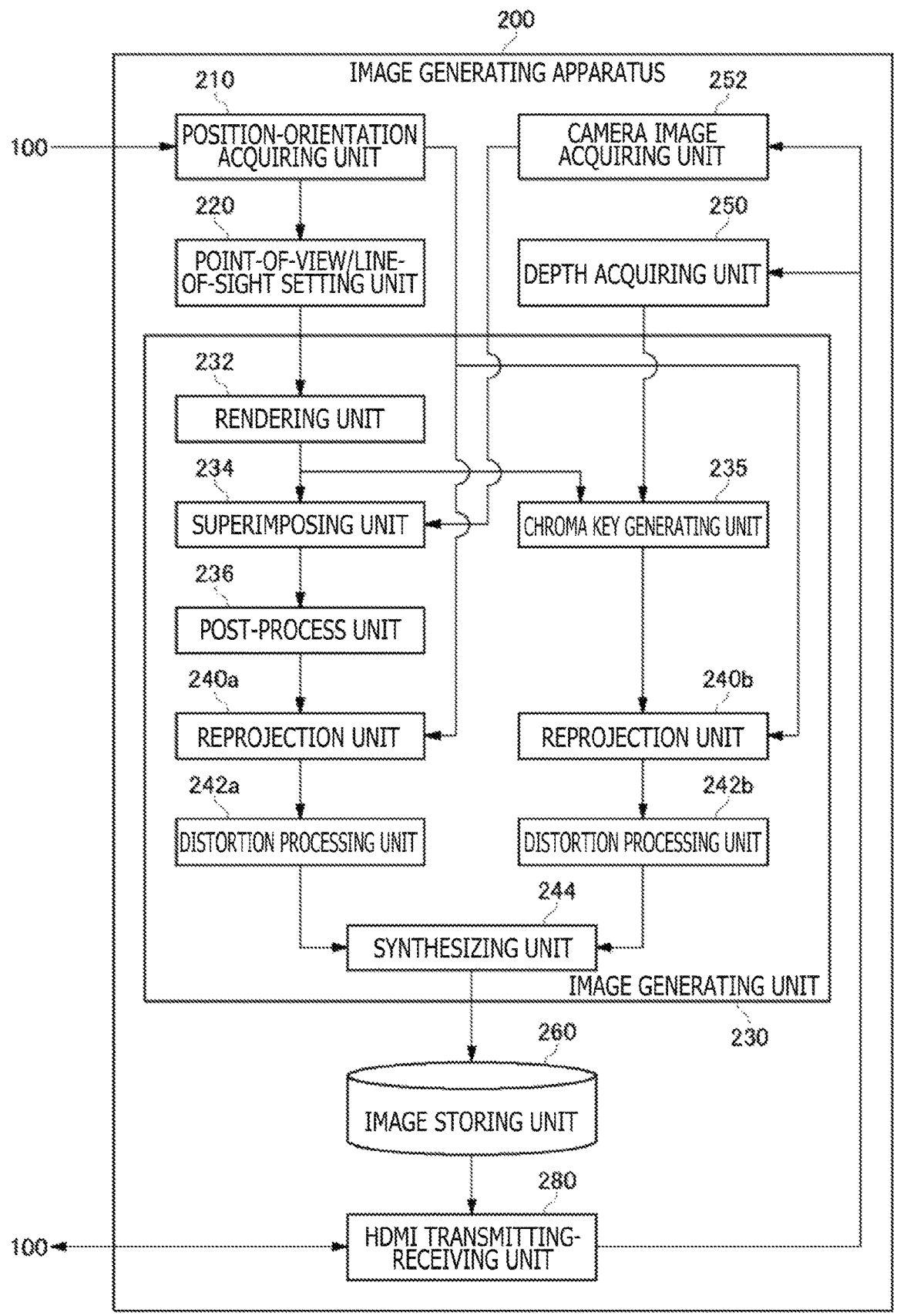
FIG. 10 is a functional configuration diagram of an image generating apparatus according to a first embodiment of the present disclosure.

FIG. 10 is a functional configuration diagram of the image generating apparatus 200 according to the first embodiment.

The HDMI transmitting-receiving unit 280 receives a camera image photographed by the camera unit 80 and depth information from the head-mounted display 100 and supplies the camera image to a camera image acquiring unit 252 and supplies the depth information to the depth acquiring unit 250. This depth information is the depth information of the camera image of a real space and is referred to as "camera depth information."

The image generating unit 230 reads out data for generation of computer graphics from the image storing unit 260 and carries out rendering of objects of a virtual space to generate a CG image. Then, the image generating unit 230 superimposes the CG image on the camera image provided from the camera image acquiring unit 252 to generate a provisional superposition image. In addition, the image generating unit 230 generates a chroma key image from the CG image based on the camera depth information provided from the depth acquiring unit 250. The post-process, the reprojection processing, and the distortion processing are executed for the provisional superposition image and the reprojection processing and the distortion processing are executed for the chroma key image. Note that the post-process is not executed for the chroma key image. At last, a final synthesized CG chroma key image is generated by masking the provisional superposition image by the chroma key image and is output to the image storing unit 260.

The image generating unit 230 includes the rendering unit 232, a superimposing unit 234, the chroma key generating unit 235, the post-process unit 236, reprojection units 240a and 240b, distortion processing units 242a and 242b, and a synthesizing unit 244.

The rendering unit 232 generates the CG image through rendering of objects of a virtual space that are visible in the direction of the line of sight from the position of the point of view of the user who wears the head-mounted display 100 in accordance with the position of the point of view and the direction of the line of sight of the user set by the point-of-view/line-of-sight setting unit 220. When the rendering unit 232 carries out the rendering of the objects of the virtual space, the depth information of the virtual objects (referred to as "scene depth information") is written to a depth buffer for virtual space rendering (referred to as "scene depth buffer") and the front-rear positional relation between the virtual objects is determined. As for pixels at which a virtual object is not rendered, a specific depth value is not written in the scene depth buffer and the scene depth value is infinite (indefinite).

Moreover, the rendering unit 232 carries out rendering of real objects of a real space photographed by the camera unit 80. Shape information and depth information of a thing of the real world are obtained by making a 3D scan of the space of the real world and carrying out spatial recognition. For example, it is possible to acquire the depth information of the real space by using a depth sensor of a system of an infrared pattern, structured light, time of flight (TOF), or the like or acquire the depth information of the real space from parallax information of a stereo camera. As above, the real space is subjected to the 3D scan in advance and modeling thereof is carried out with a polygon mesh structure. Rendering of wall, floor, ceiling, still things, and so forth of the real space is carried out by the rendering unit 232. However, they are rendered with only white without setting color information. When the rendering unit 232 carries out the rendering of the objects of the real space, the depth information of the real objects (referred to as "real space depth information") is written to a depth buffer for real space rendering (referred to as "real space depth buffer") and the front-rear positional relation between the real objects is determined.

The reason why the real space depth buffer is set separately from the scene depth buffer is because, if the depth value is written to the scene depth buffer in rendering of the real space, it becomes difficult to discriminate the scene depth value and the real space depth value and it becomes difficult to determine whether or not to specify each region as the chroma key region.

The rendering unit 232 renders, as a translucent CG image, expression relating to light of a virtual space with respect to a real space, specifically shadows cast on real objects by virtual objects and reflections of the virtual objects onto the real space, expression in which the background of an object of the virtual space existing on the near side is visible in a see-through manner, lighting expression based on a virtual light source in the virtual space, and so forth. For example, shadow mapping can render shadows and reflections by using a method in which a map of the depth from a light source is projected onto a plane or a technique such as ray tracing. By superimposing the translucent CG image of shadows and reflections of virtual objects on a low-resolution camera image of a real space, the shadows and reflections of the virtual objects with respect to the real space can be expressed. Objects of the real space are rendered with only white and therefore can be discriminated from the region in which the shadow or reflection is rendered. The rendering region of the real space is specified as the chroma key region whereas the region in which the shadow or reflection is rendered is not specified as the chroma key region.

The rendering unit 232 gives the CG image in which the virtual objects and the expression relating to light of the virtual space, such as shadows and reflections of the virtual objects, are rendered to the superimposing unit 234 and the chroma key generating unit 235.

The superimposing unit 234 superimposes the CG image on the camera image with low resolution and delay given from the camera image acquiring unit 252 to generate a provisional superposition image and give it to the post-process unit 236. The superimposing unit 234 superimposes the camera image with low resolution and delay on the region that is the region in which the scene depth value is infinite (i.e. region in which a virtual object is not rendered) and is the region for which the real space depth value is written. Due to this, the camera image with low resolution and delay is superimposed on the CG image in which shadows and reflections are rendered in a translucent manner, with the color information of the shadows and reflections left. That is, the color information of the shadows and reflections and the color information of the camera image with low resolution and delay are alpha-blended.

Here, note that the camera image is not superimposed on the region for which the real space depth value is not written and the scene depth value is written. If the mesh structure of a real space is deformed and an empty region such as a hole is set as described later, the real space depth value is not written for the empty region and the scene depth value is written. Therefore, the color of the empty region does not become the chroma key color and thus the camera image is not superimposed on the empty region. It also becomes possible to, instead, carry out rendering of a virtual space in the empty region and give an effect by which the far side is visible from the empty region.

The post-process unit 236 executes the post-process for the provisional superposition image and executes post-processing in such a manner that the provisional superposition image looks natural and smooth.

The first reprojection unit 240a receives the latest position-orientation information of the head-mounted display 100 from the position-orientation acquiring unit 210 and executes the reprojection processing for the provisional superposition image for which the post-process has been executed to convert the image to an image viewed from the latest position of the point of view and the latest direction of the line of sight of the head-mounted display 100.

The first distortion processing unit 242a executes the distortion processing for the provisional superposition image for which the reprojection processing has been executed and gives the resulting image to the synthesizing unit 244.

The chroma key generating unit 235 generates a chroma key image based on the camera depth information given from the depth acquiring unit 250 and the scene depth information and the real space depth information given from the rendering unit 232. Specifically, the chroma key generating unit 235 generates the chroma key image in which the region that is the region in which the scene depth value is infinite or the real space depth value is written and is other than the region in which a shadow or reflection is rendered is painted out with the chroma key color and the part of the real object existing on the near side relative to the virtual object is painted out with the chroma key color through reference to the camera depth information and the scene depth information.

The post-process is not executed for the chroma key image.

The second reprojection unit 240b receives the latest position-orientation information of the head-mounted display 100 from the position-orientation acquiring unit 210 and executes the reprojection processing for the chroma key image to convert the image to an image viewed from the latest position of the point of view and the latest direction of the line of sight of the head-mounted display 100.

The second distortion processing unit 242b executes the distortion processing for the chroma key image for which the reprojection processing has been executed and gives the resulting image to the synthesizing unit 244.

The synthesizing unit 244 carries out synthesis with use of the chroma key image as a mask for the provisional superposition image to generate a synthesized CG chroma key image and store it in the image storing unit 260.

Here, when the first reprojection unit 240a executes the reprojection processing for the provisional superposition image and the first distortion processing unit 242a executes the distortion processing for the provisional superposition image after the reprojection processing, generally interpolation processing such as bilinear interpolation is executed at the time of sampling of pixels. On the other hand, when the second reprojection unit 240*b* executes the reprojection processing for the chroma key image and the second distortion processing unit 242*b* executes the distortion processing for the chroma key image after the reprojection processing, point sampling is carried out at the time of sampling of pixels. This is because, if interpolation processing such as bilinear interpolation is executed for the chroma key image, the chroma key color is mixed with a non-chroma-key color and becomes another color and the meaning of the chroma key image is lost.

In the reprojection processing and the distortion processing for the chroma key image, the following two methods may be used besides the above-described point sampling. In the first method, bilinear interpolation is carried out between the chroma key color and non-chroma-key colors and pixel values of intermediate colors are once calculated at the time of sampling. However, a predetermined threshold is set. Furthermore, if the pixel value after the interpolation is equal to or smaller than the threshold, the pixel value is set to the chroma key color. If the pixel value after the interpolation exceeds the threshold, the pixel value is set to the original non-chroma-key color. According to this method, the intermediate colors generated due to the interpolation are discarded and whether the color becomes the chroma key color or becomes the original non-chroma-key color is determined depending on whether the pixel value exceeds the threshold. Therefore, the chroma key color is not mixed with the non-chroma-key color.

In the second method, when the chroma key image is generated, sampling of neighboring four pixels of a point to which (u, v) refers is carried out. Furthermore, the color is set to the chroma key color if all of the neighboring four pixels apply to the condition of the chroma key and the color is not set to the chroma key color if all of the neighboring four pixels do not apply to the condition of the chroma key. As the way of selecting the neighboring pixels, selecting nine pixels may be employed besides selecting four pixels. According to this method, the edge boundary part is not painted out with the chroma key color. Thus, the CG image and the camera image look to merge more naturally near the boundary.

The HDMI transmitting-receiving unit 280 reads out frame data of the synthesized CG chroma key image generated by the image generating unit 230 from the image storing unit 260 and transmits the frame data to the head-mounted display 100 in accordance with the HDMI.

Figure 11:
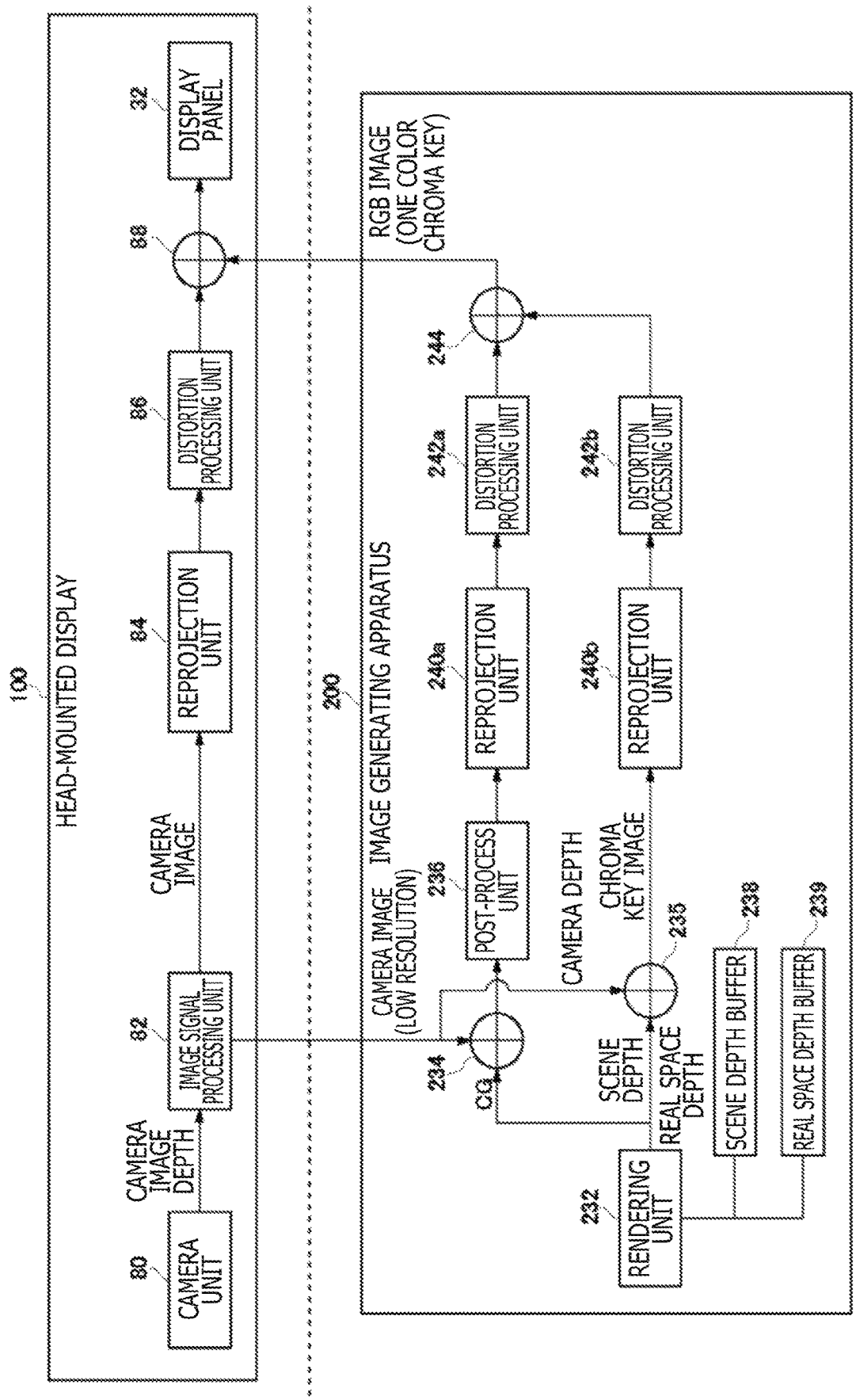
FIG. 11 is a diagram explaining the configuration of an image generating system according to the first embodiment for superimposing a CG image on a camera image to generate an augmented reality image.

FIG. 11 is a diagram explaining the configuration of an image generating system according to the first embodiment for superimposing a CG image on a camera image to generate an augmented reality image.

Camera image and camera depth information of the external world photographed by the camera unit 80 of the head-mounted display 100 are supplied to the image signal processing unit 82. The image signal processing unit 82 executes the image signal processing and the distortion correction processing for the camera image with low delay and high resolution and gives the resulting image to the reprojection unit 84. Moreover, the image signal processing unit 82 transmits the camera image for which the image signal processing and the distortion correction processing have been executed and the camera depth information to the image generating apparatus 200. The camera image is supplied to the superimposing unit 234 and the camera depth information is supplied to the chroma key generating unit 235. The camera image transmitted to the image generating apparatus 200 involves delay and has a low resolution.

The rendering unit 232 of the image generating apparatus 200 carries out rendering of real objects of a real space. In addition, the rendering unit 232 generates virtual objects viewed from the position of the point of view and the direction of the line of sight of the user who wears the head-mounted display 100 and carries out rendering of expression relating to light of the virtual space with respect to the real space, specifically shadows cast on real objects by virtual objects and reflections of virtual objects, making virtual objects translucent, lighting expression based on a virtual light source, and so forth. The rendering unit 232 gives the generated CG image to the superimposing unit 234 and gives the scene depth information and the real space depth information to the chroma key generating unit 235.

The superimposing unit 234 superimposes the camera image on the CG image to generate a provisional superposition image and give it to the post-process unit 236. Here, the camera image provided from the head-mounted display 100 may have a low resolution and involve delay. This is because the part of the camera image in the provisional superposition image is masked by the chroma key image to be finally erased. The superimposing unit 234 superimposes the camera image on the region for which the scene depth value is not written and the real space depth value is written. Therefore, the camera image is superimposed on the region in which the virtual object is not rendered and the region in which the expression relating to the light of the virtual space such as a shadow or reflection is rendered. In the region in which the expression relating to the light of the virtual space such as a shadow or reflection is rendered, the color information of the expression relating to the light of the virtual space such as a shadow or reflection is synthesized with the low-resolution camera image as a translucent CG image.

The post-process unit 236 executes the post-process for the provisional superposition image. The reprojection unit 240*a* converts the provisional superposition image for which the post-process has been executed in conformity to the latest position of the point of view and the latest direction of the line of sight. The distortion processing unit 242*a* executes the distortion processing on the provisional superposition image after the reprojection and gives the resulting image to the synthesizing unit 244.

The chroma key generating unit 235 generates a chroma key image based on the camera depth information, the scene depth information, and the real space depth information. The region for which the scene depth value is not written is painted out with the chroma key color. However, the translucent CG region in which the expression relating to the light of the virtual space such as a shadow or reflection is rendered is not painted out with the chroma key color. Furthermore, the positional relation between the objects of the real space and the objects of the virtual space is determined in real time based on the camera depth information and the scene depth information, and the part of the real moving thing (hand, ball, or the like) existing on the near side relative to the virtual object is painted out with the chroma key color. The reprojection unit 240*b* converts the chroma key image in conformity to the latest position of the point of view and the latest direction of the line of sight. The distortion processing unit 242*b* executes the distortion processing for the chroma key image after the reprojection and gives the resulting image to the synthesizing unit 244.

The synthesizing unit 244 generates a synthesized CG chroma key image by masking the provisional superposition image by the chroma key image. Here, the provisional superposition image has been subjected to the post-process and therefore is a smooth image. Therefore, the boundary between the camera image and the CG image is not conspicuous. On the other hand, the post-process has not been executed for the chroma key image. Thus, aliasing and false color do not occur at the boundaries of the virtual objects. Therefore, when the superposition image for which the post-process has been executed is masked by the chroma key image for which the post-process has not been executed, the synthesized CG chroma key image that does not involve aliasing and false color at the boundaries of the virtual objects and is natural and smooth is synthesized.

Although the scene depth value is infinite, the translucent CG region in which a shadow or reflection is rendered is not painted out with the chroma key color. Therefore, the translucent CG region of the shadow or reflection is left in the synthesized CG chroma key image in the state of being superimposed on the low-resolution camera image.

The synthesized CG chroma key image is transmitted to the head-mounted display 100 as an RGB image in which specific one color is specified for the chroma key, and is supplied to the AR superimposing unit 88.

The reprojection unit 84 of the head-mounted display 100 converts the camera image with low delay and high resolution for which the image signal processing and the distortion correction processing have been executed in conformity to the latest position of the point of view and the latest direction of the line of sight and supplies the resulting image to the distortion processing unit 86. The distortion processing unit 86 executes the distortion processing for the camera image with low delay and high resolution after the reprojection. The AR superimposing unit 88 generates an augmented reality image by superimposing the synthesized CG chroma key image supplied from the image generating apparatus 200 on the camera image with low delay and high resolution after the distortion processing. The generated augmented reality image is displayed on the display panel 32. The camera image with low delay and high resolution is superimposed on the region for which the chroma key color is specified on the side of the head-mounted display 100.

Figure 12:
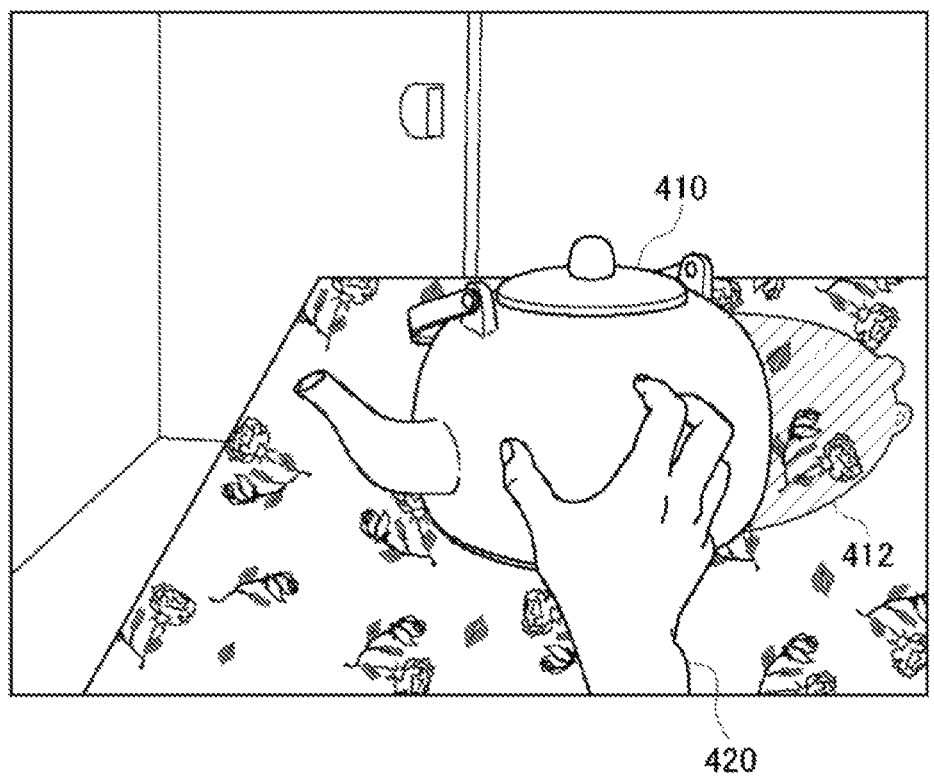
FIG. 12 is a diagram explaining an augmented reality image obtained by superimposing a CG image on a camera image by the image generating system according to the first embodiment.

FIG. 12 is a diagram explaining an augmented reality image obtained by superimposing a CG image on a camera image by the image generating system according to the first embodiment. Similarly to FIG. 5, a user attempts to touch the teapot 410 that is a virtual object and the teapot 410, which is the virtual object, is superimposed on the camera image in which the hand 420 is captured. A shadow 412 cast on the real table by the teapot 410, which is the virtual object, is rendered as translucent CG in the form of being superimposed on the camera image. Thus, the floral pattern on the surface of the real table is visible in a see-through manner in the rendering region of the shadow 412.

Figure 13:
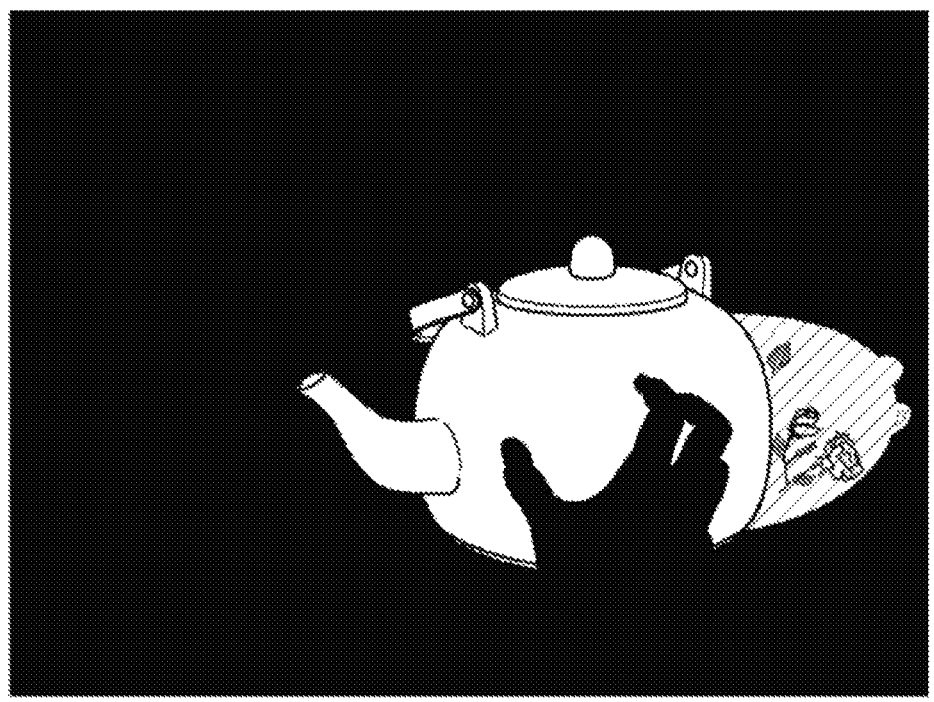
FIG. 13 is a diagram explaining a synthesized CG chroma key image used by the image generating system according to the first embodiment.

FIG. 13 is a diagram explaining a synthesized CG chroma key image used by the image generating system according to the first embodiment. In the synthesized CG chroma key image, the rendering region of a virtual object (here, teapot) and the rendering region of a shadow or reflection of the virtual object (here, shadow cast on the table surface with a floral pattern by the teapot) are CG and the other region is painted out with the chroma key color. Furthermore, if a real moving thing (here, hand of the user) exists on the near side relative to the virtual object, the part of the moving thing on the near side is also painted out with the chroma key color.

The synthesized CG chroma key image of FIG. 13 is superimposed on a high-resolution camera image on the side of the head-mounted display 100 and thereby the augmented reality image of FIG. 12 is generated. Note that, although the part of the shadow of the teapot 410 is synthesized with a low-resolution camera image, the camera image other than this part has a high resolution including the region of the hand of the user.

When the image generating system of the first embodiment is used, it is also possible to virtually make a hole in a wall, ceiling, table, or the like of a real space and superimpose a CG image thereon. This will be described with reference to FIG. 14 and FIG. 15.

Figure 14:
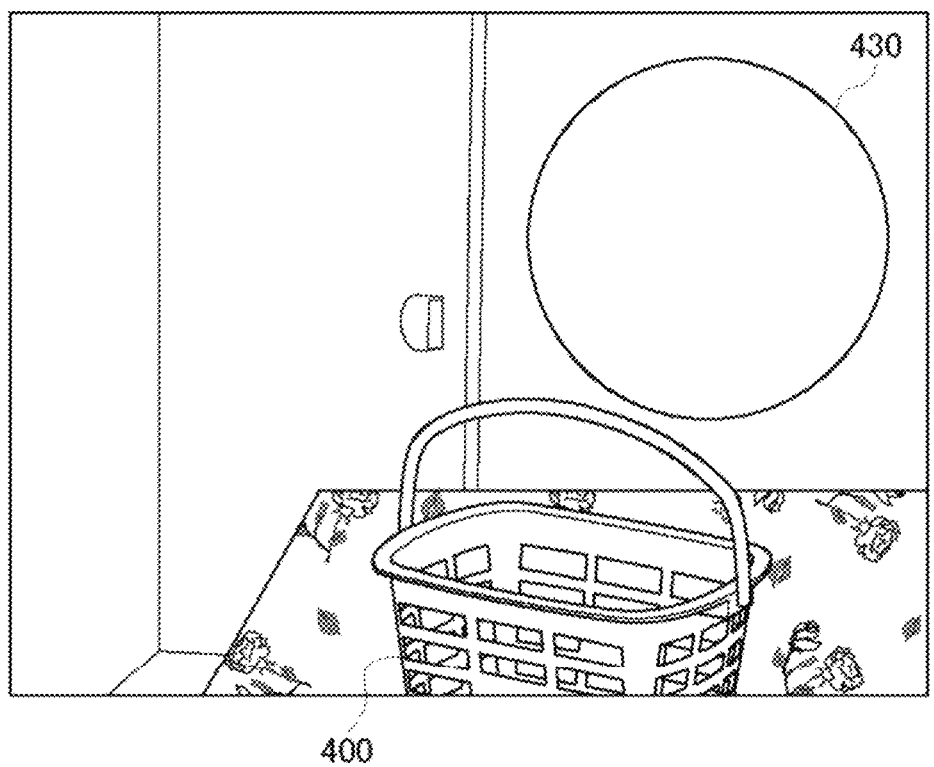
FIG. 14 is a diagram explaining an example in which a polygon mesh of a real space is deformed to make a hole in a wall.

FIG. 14 is a diagram explaining an example in which a polygon mesh of a real space is deformed to make a hole in a wall. The polygon mesh of the real space is obtained by a 3D scan and a hole 430 can be set in the wall as in FIG. 14 by deforming the polygon mesh. As another expression method of the hole 430, a texture with an alpha mask may be used.

No thing of the real space exists in the hole 430. Therefore, when the rendering unit 232 carries out rendering of the real space, the depth information is not written to the region corresponding to the hole 430 in the real space depth buffer. Meanwhile, the rendering unit 232 can carry out rendering of a virtual object in the hole 430 and, on this occasion, the depth information is written to the region corresponding to the hole 430 in the scene depth buffer. Therefore, when the superimposing unit 234 superimposes a camera image on a CG image, the camera image is not superimposed on the hole 430, for which the real space depth value is not set, and the CG image is displayed in the hole 430, for which the scene depth value is set.

Figure 15:
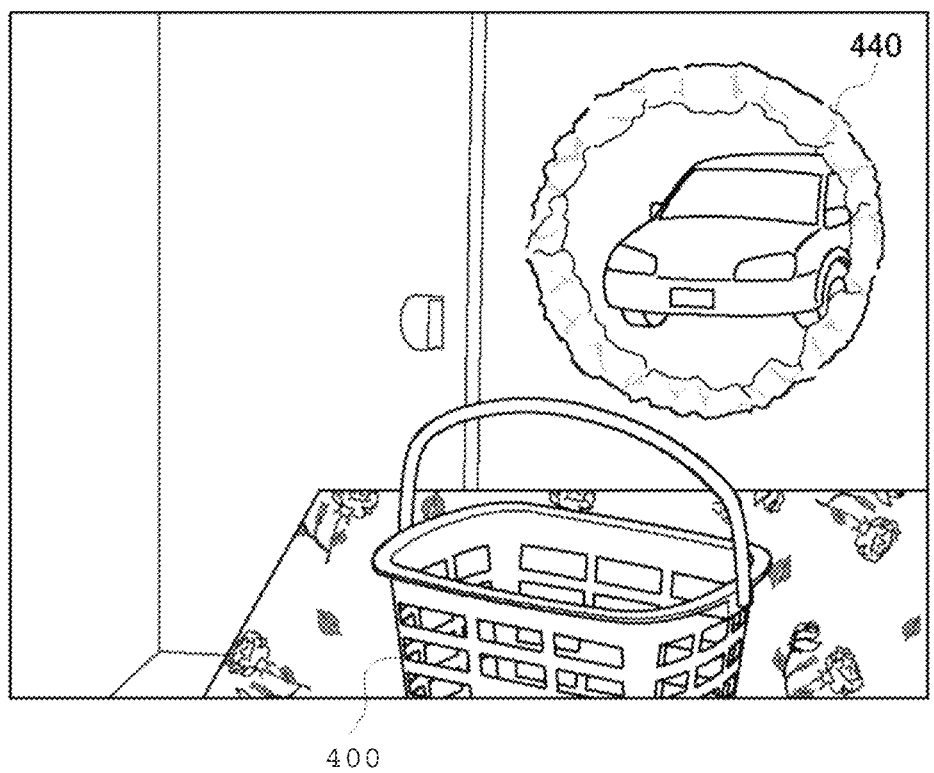
FIG. 15 is a diagram explaining an example in which a virtual object is rendered in the hole of the wall of the real space.

FIG. 15 is a diagram explaining an example in which a virtual object is rendered in the hole of the wall of the real space. In FIG. 15, a virtual hole 440 is rendered based on CG corresponding to the hole 430 in FIG. 14 and a virtual car is rendered based on CG on the far side of the virtual hole 440.

According to the image generating system of the first embodiment, a sense of discomfort regarding the boundary between the camera image and the CG image is alleviated by the post-process. In addition, the post-process is not executed for the chroma key image. Therefore, the chroma key image without aliasing and false color can be generated and the synthesized CG chroma key image with high quality can be generated. Because this synthesized CG chroma key image is superimposed on the camera image to generate the augmented reality image, the augmented reality image without unnaturalness can be generated. Furthermore, also when a translucent part exists in the CG image, the translucent part can be superimposed on the camera image and translucency processing can be executed when the post-processing is executed. Thus, the translucent part can also be expressed although latency due to the rendering exists. Moreover, the synthesized CG chroma key image is an RGB image in which specific one color is specified as the chroma key image and thus can be transmitted by a general communication interface, such as the HDMI, that can transmit the RGB image.

In the above description, the synthesized CG chroma key image is an RGB image in which specific one color is specified as the chroma key image. However, the chroma key color of the chroma key image may be stored in the alpha component of RGBA. Specifically, until intermediate processing of the post-process, processing may be executed for the part set to the chroma key color in the image, with the alpha component of RGBA made transmissive. Then, the color of the part in which the alpha component is transmissive may be replaced by the chroma key color at the final stage of the post-process. This eliminates the need to use two different frame buffers for storing the provisional superposition image and the chroma key image and processing of the provisional superposition image and the chroma key image can be executed on one frame buffer.

A second embodiment will be described. The configuration of the head-mounted display 100 is basically the same as that illustrated in FIG. 7. However, the reprojection unit 84 has a first reprojection unit 84*a* for a camera image and a second reprojection unit 84*b* for a synthesized CG chroma key image.

Figure 16:
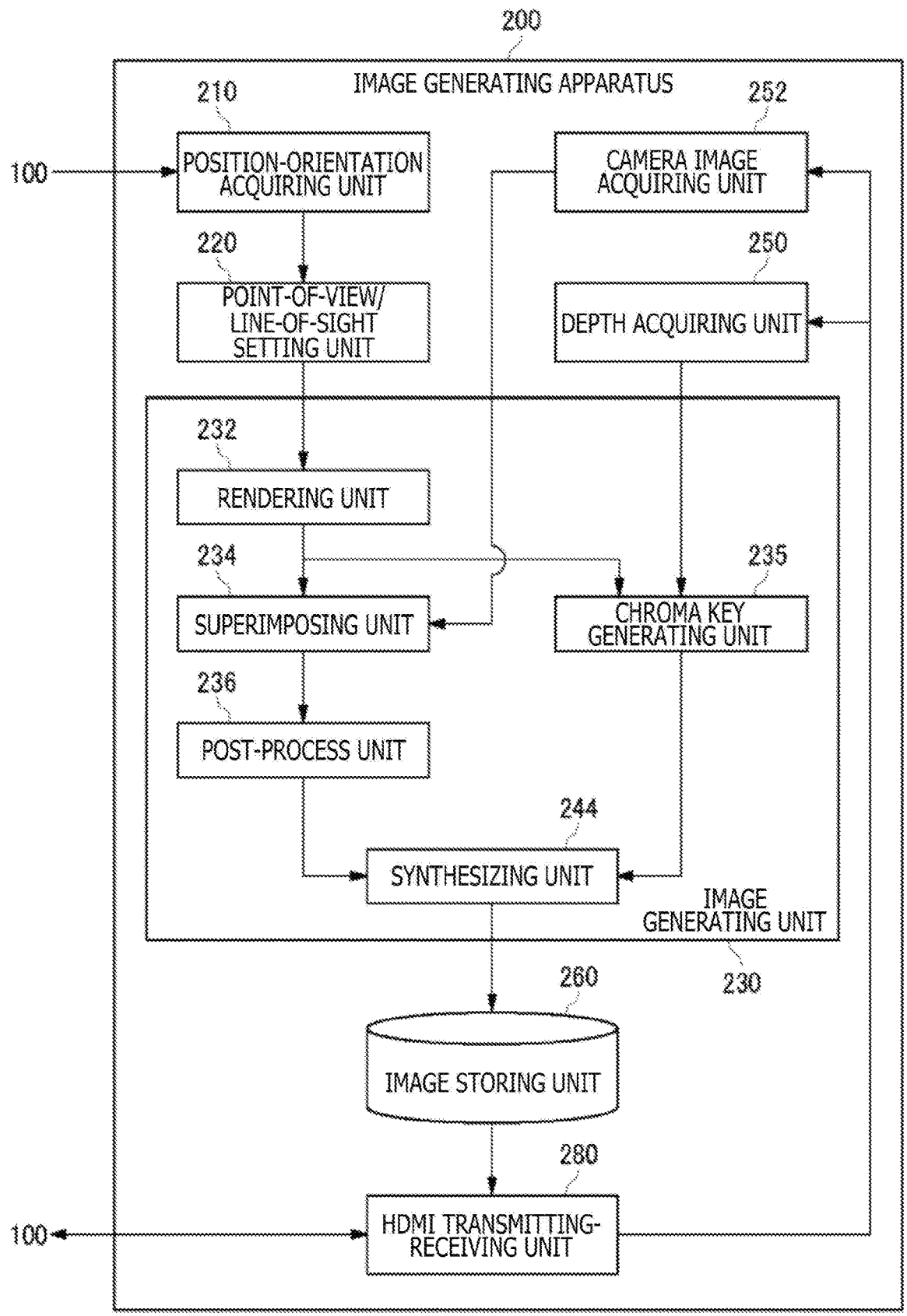
FIG. 16 is a functional configuration diagram of an image generating apparatus according to a second embodiment of the present disclosure.

FIG. 16 is a functional configuration diagram of the image generating apparatus 200 according to the second embodiment.

The HDMI transmitting-receiving unit 280 receives a camera image photographed by the camera unit 80 and depth information from the head-mounted display 100 and supplies the camera image to the camera image acquiring unit 252 and supplies the depth information to the depth acquiring unit 250.

The image generating unit 230 reads out data for generation of computer graphics from the image storing unit 260 and carries out rendering of objects of a virtual space to generate a CG image. Then, the image generating unit 230 superimposes the CG image on the camera image provided from the camera image acquiring unit 252 to generate a provisional superposition image. In addition, the image generating unit 230 generates a chroma key image from the CG image based on the camera depth information provided from the depth acquiring unit 250. The post-process is executed for the provisional superposition image whereas the post-process is not executed for the chroma key image. At last, a final synthesized CG chroma key image is generated by masking the provisional superposition image by the chroma key image and is output to the image storing unit 260.

The image generating unit 230 includes the rendering unit 232, the superimposing unit 234, the chroma key generating unit 235, the post-process unit 236, and the synthesizing unit 244.

The rendering unit 232 generates the CG image through rendering of objects of a virtual space that are visible in the direction of the line of sight from the position of the point of view of the user who wears the head-mounted display 100 in accordance with the position of the point of view and the direction of the line of sight of the user set by the point-of-view/line-of-sight setting unit 220. When the rendering unit 232 carries out the rendering of the objects of the virtual space, the scene depth information is written to the scene depth buffer.

Moreover, the rendering unit 232 carries out rendering of real objects of a real space photographed by the camera unit 80. When the rendering unit 232 carries out the rendering of the objects of the real space, the real space depth information of the real objects is written to the real space depth buffer.

The rendering unit 232 gives the CG image in which the virtual objects and expression relating to light of the virtual space, such as shadows and reflections of the virtual objects, are rendered to the superimposing unit 234 and the chroma key generating unit 235.

The superimposing unit 234 superimposes the CG image on the camera image with low resolution and delay given from the camera image acquiring unit 252 to generate a provisional superposition image and give it to the post-process unit 236. The superimposing unit 234 superimposes the camera image with low resolution and delay on the region that is the region in which the scene depth value is infinite and is the region for which the real space depth value is written.

The post-process unit 236 executes the post-process for the provisional superposition image and executes post-processing in such a manner that the provisional superposition image looks natural and smooth.

The chroma key generating unit 235 generates a chroma key image based on the camera depth information given from the depth acquiring unit 250 and the scene depth information and the real space depth information given from the rendering unit 232.

The synthesizing unit 244 carries out synthesis with use of the chroma key image as a mask for the provisional superposition image to generate a synthesized CG chroma key image and store it in the image storing unit 260.

The HDMI transmitting-receiving unit 280 reads out frame data of the synthesized CG chroma key image generated by the image generating unit 230 from the image storing unit 260 and transmits the frame data to the head-mounted display 100 in accordance with the HDMI.

Figure 17:
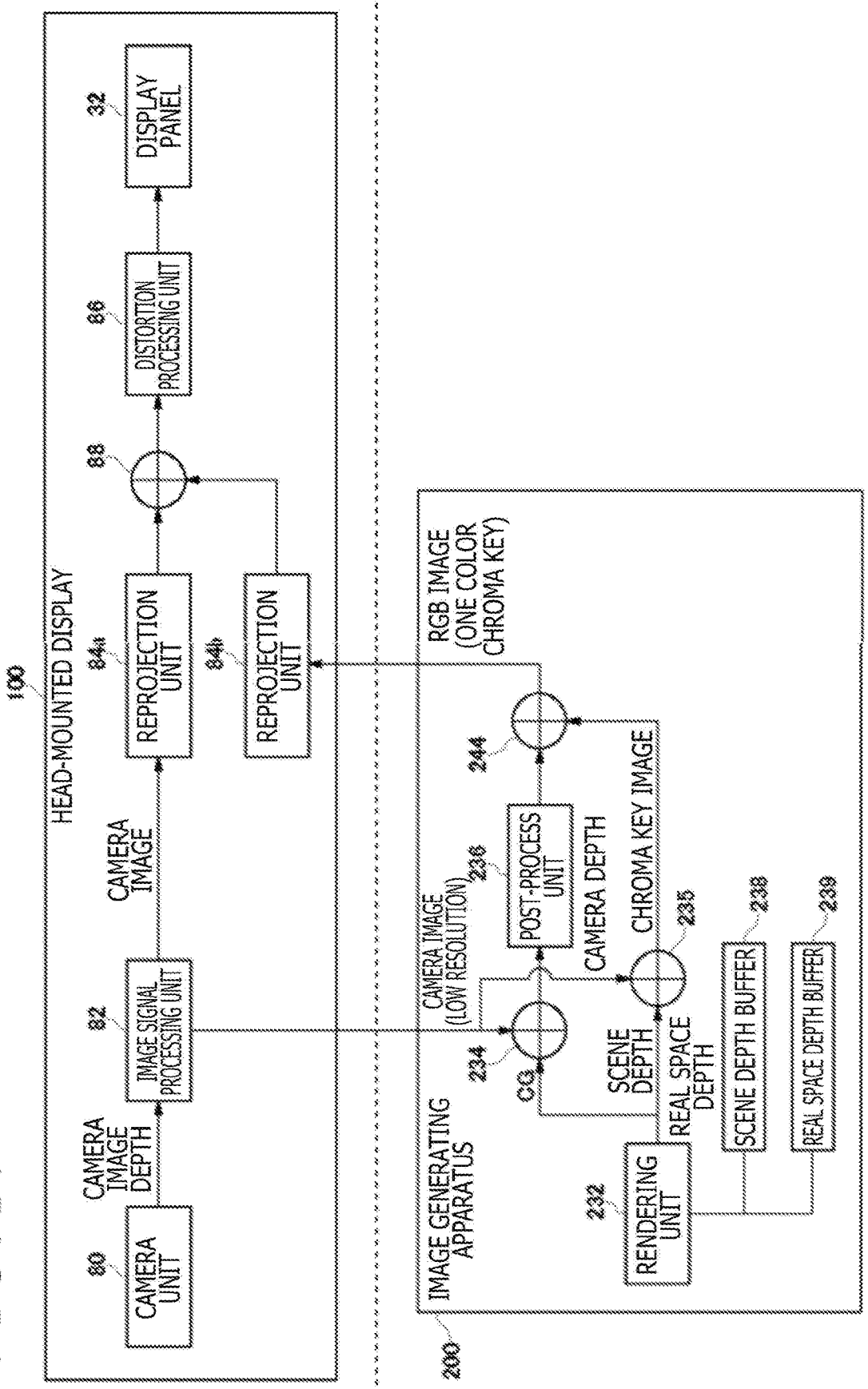
FIG. 17 is a diagram explaining the configuration of an image generating system according to the second embodiment for superimposing a CG image on a camera image to generate an augmented reality image.

FIG. 17 is a diagram explaining the configuration of an image generating system according to the second embodiment for superimposing a CG image on a camera image to generate an augmented reality image.

Camera image and camera depth information of the external world photographed by the camera unit 80 of the head-mounted display 100 are supplied to the image signal processing unit 82. The image signal processing unit 82 executes the image signal processing and the distortion correction processing for the camera image with low delay and high resolution and gives the resulting image to the reprojection unit 84. Moreover, the image signal processing unit 82 transmits the camera image for which the image signal processing and the distortion correction processing have been executed and the camera depth information to the image generating apparatus 200. The camera image is supplied to the superimposing unit 234 and the camera depth information is supplied to the chroma key generating unit 235. The camera image transmitted to the image generating apparatus 200 involves delay and has a low resolution.

The rendering unit 232 of the image generating apparatus 200 carries out rendering of real objects of a real space. In addition, the rendering unit 232 generates virtual objects viewed from the position of the point of view and the direction of the line of sight of the user who wears the head-mounted display 100 and carries out rendering of lighting expression such as shadows cast on real objects by virtual objects and reflections of virtual objects. The rendering unit 232 gives the generated CG image to the superimposing unit 234 and gives the scene depth information and the real space depth information to the chroma key generating unit 235.

The superimposing unit 234 superimposes the camera image on the CG image to generate a provisional superposition image and give it to the post-process unit 236. Similarly to the first embodiment, the camera image provided from the head-mounted display 100 may have a low resolution and involve delay.

The post-process unit 236 executes the post-process for the provisional superposition image and gives the resulting image to the synthesizing unit 244.

The chroma key generating unit 235 generates a chroma key image based on the camera depth information, the scene depth information, and the real space depth information and gives it to the synthesizing unit 244.

The synthesizing unit 244 generates a synthesized CG chroma key image by masking the superposition image by the chroma key image. Similarly to the first embodiment, when the superposition image for which the post-process has been executed is masked by the chroma key image for which the post-process has not been executed, the synthesized CG chroma key image that does not involve aliasing and false color at the boundaries of the virtual objects and is natural and smooth is synthesized.

The synthesized CG chroma key image is transmitted to the head-mounted display 100 as an RGB image in which specific one color is specified for the chroma key, and is supplied to the reprojection unit 84*b*.

The first reprojection unit 84*a* of the head-mounted display 100 converts the camera image with low delay and high resolution for which the image signal processing and the distortion correction processing have been executed in conformity to the latest position of the point of view and the latest direction of the line of sight and supplies the resulting image to the AR superimposing unit 88.

The second reprojection unit 84*b* of the head-mounted display 100 converts the synthesized CG chroma key image in conformity to the latest position of the point of view and the latest direction of the line of sight and supplies the resulting image to the AR superimposing unit 88.

Here, the reason why the reprojection unit is divided into the first reprojection unit 84*a* for a camera image and the second reprojection unit 84*b* for a synthesized CG chroma key image in the head-mounted display 100 is because a long time is taken for rendering of the image generating apparatus 200 and the amount of difference that should be corrected differs depending on reprojection. For example, reprojection of the next frame is executed in the first reprojection unit 84*a* whereas reprojection of the frame after the next frame is desired to be executed in the second reprojection unit 84*b*.

The AR superimposing unit 88 generates an augmented reality image by superimposing the synthesized CG chroma key image for which the reprojection processing has been executed by the second reprojection unit 84*b* on the camera image with low delay and high resolution for which the reprojection processing has been executed by the first reprojection unit 84*a*, and supplies the augmented reality image to the distortion processing unit 86. The camera image with low delay and high resolution is superimposed on the region for which the chroma key color is specified on the side of the head-mounted display 100.

The distortion processing unit 86 executes the distortion processing for the augmented reality image. The generated augmented reality image is displayed on the display panel 32.

According to the image generating system of the second embodiment, similarly to the first embodiment, the synthesized CG chroma key image is superimposed on the camera image to generate the augmented reality image. Therefore, there is an advantage that the augmented reality image without unnaturalness can be generated. Besides, the following advantage exists. Differently from the first embodiment, the reprojection processing is executed for the camera image and the synthesized CG chroma key image on the side of the head-mounted display 100. Thus, the camera image and the synthesized CG chroma key image can be converted in conformity to the position of the point of view and the direction of the line of sight immediately before display on the display panel 32 and the augmented reality image with tracking capability can be provided with high accuracy. Furthermore, the burden of the reprojection processing on the side of the image generating apparatus 200 can be alleviated. Thus, more resources can be applied to rendering on the side of the image generating apparatus 200.

In the first embodiment and the second embodiment, the configurations in which the post-process by the post-process unit 236 is not executed for the chroma key image are described. However, as a modification example, a configuration in which adjustment of the point of view and a post-process for scaling are applied to the chroma key image may be employed. In this case, if a method in which the average of surrounding pixels is used, or the like, is employed when pixels are interpolated, the color of the boundary changes to a different color from the chroma key color. Therefore, the post-process is desired to be applied in such a manner that the chroma key image is not changed. Alternatively, after a normal post-process with which the color of the boundary changes is applied to the chroma key image, only the region that completely matches the original chroma key color may be used as a mask.

The present disclosure is described above based on the embodiments. The embodiments are exemplification and it will be understood by those skilled in the art that various modification examples are possible in combinations of the respective constituent elements and the respective processing processes of them and that such modification examples also fall within the range of the present disclosure.

In the above description, kinds of processing such as adjustment of the depth of field, tone mapping, and anti-aliasing are exemplified as the post-process. However, kinds of processing including distortion processing, simple scaling, trapezoidal transform, and so forth may also be referred to as the post-process.

The present disclosure contains subject matter related to that disclosed in Japanese Priority Patent Application JP 2018-195220 filed in the Japan Patent Office on Oct. 16, 2018 and Japanese Priority Patent Application JP 2019-079475 filed in the Japan Patent Office on Apr. 18, 2019, the entire contents of which are hereby incorporated by reference.

What is claimed is:

1. An image generating apparatus comprising:
   a rendering unit configured to carry out rendering of an object of a virtual space and an object of a real space and carry out rendering of expression relating to light of the virtual space with respect to the real space to generate a computer graphics image;
   a superimposing unit configured to superimpose the computer graphics image on a photographed image of the real space to generate a provisional superposition image;
   a chroma key generating unit configured to generate a chroma key image through executing chroma key processing for the computer graphics image based on depth information of the photographed image of the real space; and
   a synthesizing unit configured to generate a synthesized chroma key image used for being superimposed on the photographed image of the real space to generate an augmented reality image by applying a mask to the provisional superposition image by the chroma key image,
   wherein the chroma key generating unit employs a region of the real space in which the object of the virtual space is not rendered as a chroma key region and does not employ a region of the real space in which the expression relating to the light of the virtual space exists as a chroma key region.

2. The image generating apparatus according to claim 1, wherein the expression relating to the light of the virtual space with respect to the real space is at least one of a shadow or reflection of the object of the virtual space onto the object of the real space, expression in which a background of the object of the virtual space is visible in a see-through manner, and lighting expression based on a virtual light source in the virtual space.

3. The image generating apparatus according to claim 1, further comprising:
   deforming a polygon mesh structure obtained by carrying out spatial recognition of the real space to generate an empty region in which rendering of a virtual space is carried out,
   wherein the rendering unit carries out the rendering of the object of the real space based on the deformed polygon mesh structure.

4. The image generating apparatus according to claim 1, further comprising:
   a post-process unit configured to execute a post-process for the provisional superposition image,
   wherein the synthesizing unit generates the synthesized chroma key image by applying a mask to the provisional superposition image for which a post-process has been executed by the chroma key image for which a post-process has not been executed.

5. The image generating apparatus according to claim 1, further comprising:
   a reprojection unit configured to convert the provisional superposition image for which a post-process has been executed and the chroma key image in conformity to a new position of a point of view or a new direction of a line of sight,
   wherein the synthesizing unit generates the synthesized chroma key image by applying a mask to the provisional superposition image for which reprojection processing has been executed by the chroma key image for which reprojection processing has been executed.

6. The image generating apparatus according to claim 1, wherein the photographed image of the real space used when the superimposing unit generates the provisional superposition image has a lower resolution than the photographed image of the real space used for generating the augmented reality image.

7. The image generating apparatus according to claim 6, wherein the expression relating to the light of the virtual space with respect to the real space is superimposed on the photographed image with the lower resolution as a translucent computer graphics image.

8. An image generating system comprising:
   a head-mounted display; and
   an image generating apparatus,
   wherein the image generating apparatus includes
   a rendering unit configured to carry out rendering of an object of a virtual space and an object of a real space and carry out rendering of expression relating to light of the virtual space with respect to the real space to generate a computer graphics image,
   a first superimposing unit configured to superimpose the computer graphics image on a photographed image of the real space transmitted from the head-mounted display to generate a provisional superposition image,
   a chroma key generating unit configured to generate a chroma key image through executing chroma key processing for the computer graphics image based on depth information of the photographed image of the real space transmitted from the head-mounted display, and
   a synthesizing unit configured to generate a synthesized chroma key image used for being superimposed on the photographed image of the real space to generate an augmented reality image by applying a mask to the provisional superposition image by the chroma key image,
   the head-mounted display includes
   a second superimposing unit configured to generate the augmented reality image by synthesizing the photographed image of the real space with the synthesized chroma key image transmitted from the image generating apparatus, and
   the chroma key generating unit employs a region of the real space in which the object of the virtual space is not rendered as a chroma key region and does not employ a region of the real space in which the expression relating to the light of the virtual space exists as a chroma key region.

9. An image generating method comprising:
   carrying out rendering of an object of a virtual space and an object of a real space and carrying out rendering of expression relating to light of the virtual space with respect to the real space to generate a computer graphics image;
   superimposing the computer graphics image on a photographed image of the real space to generate a provisional superposition image;
   generating a chroma key image through executing chroma key processing for the computer graphics image based on depth information of the photographed image of the real space; and
   generating a synthesized chroma key image used for being superimposed on the photographed image of the real space to generate an augmented reality image by applying a mask to the provisional superposition image by the chroma key image,
   wherein the generating a chroma key image employs a region of the real space in which the object of the virtual space is not rendered as a chroma key region and does not employ a region of the real space in which the expression relating to the light of the virtual space exists as a chroma key region.

10. A non-transitory, computer readable storage medium containing a program, which when executed by a computer, causes the computer to perform an image generating method by carrying out actions, comprising:
    carrying out rendering of an object of a virtual space and an object of a real space and carrying out rendering of expression relating to light of the virtual space with respect to the real space to generate a computer graphics image;
    superimposing the computer graphics image on a photographed image of the real space to generate a provisional superposition image;
    generating a chroma key image through executing chroma key processing for the computer graphics image based on depth information of the photographed image of the real space; and
    generating a synthesized chroma key image used for being superimposed on the photographed image of the real space to generate an augmented reality image by applying a mask to the provisional superposition image by the chroma key image,
    wherein the generating a chroma key image employs a region of the real space in which the object of the virtual space is not rendered as a chroma key region and does not employ a region of the real space in which the expression relating to the light of the virtual space exists as a chroma key region.

\* \* \* \* \*